Figure 1:
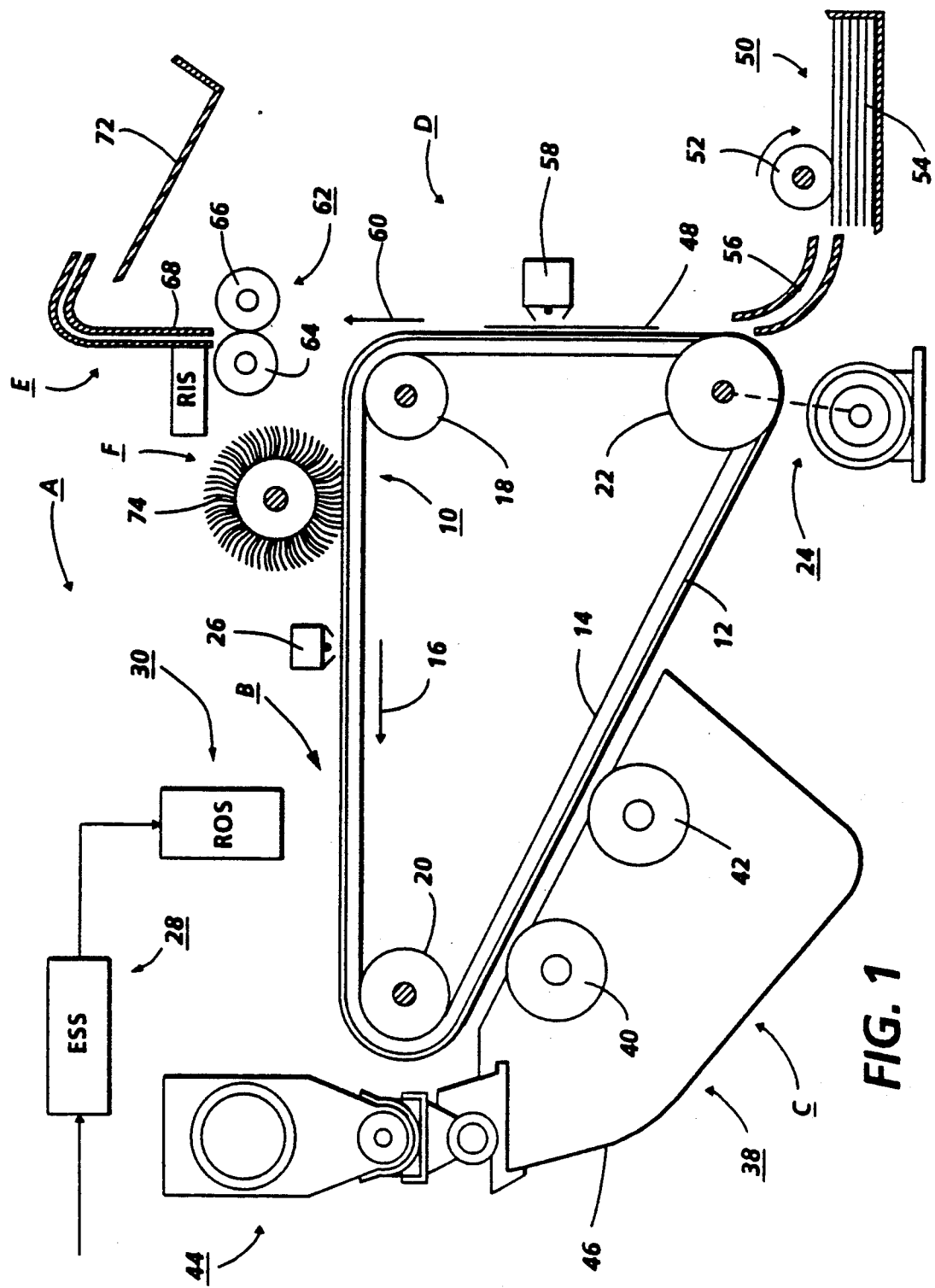

United States Patent [19]

Bares

[11] Patent Number: 5,057,936
[45] Date of Patent: Oct. 15, 1991

[54] COPY QUALITY MONITORING

[75] Inventor: Jan Bares, Webster, N.Y.

[73] Assignee: Xerox Corporation, Stamford, Conn.

[21] Appl. No.: 396,400

[22] Filed: Aug. 21, 1989

[51] Int. Cl.$^5$ .............................................. H04N 1/00
[52] U.S. Cl. .................................................... 358/405
[58] Field of Search ............... 358/401, 405, 406, 441, 358/488, 437; 355/205, 206, 209, 308

[56]  References Cited
U.S. PATENT DOCUMENTS

| 4,300,169 | 11/1981 | Sato | 358/401 |
| 4,674,863 | 6/1987 | Tomosada et al. | 355/14 E |
| 4,745,434 | 5/1988 | Shimomura et al. | 355/14 R |
| 4,760,574 | 7/1988 | Budworth et al. | 371/5.3 |
| 4,779,106 | 10/1988 | Mills | 358/406 |
| 4,802,231 | 1/1989 | Davis | 382/34 |
| 4,849,821 | 7/1989 | Allen et al. | 358/405 |

FOREIGN PATENT DOCUMENTS 53-118917 10/1978 Japan .................................... 358/405
56-80973 7/1981 Japan .................................... 358/405

Primary Examiner—Jin F. Ng
Assistant Examiner—Thomas D. Lee
Attorney, Agent, or Firm—H. Fleischer; J. E. Beck; R. Zibelli

[57] ABSTRACT

An apparatus that monitors the quality of copies reproduced by a printing machine. A signal of an image to be reproduced by the printing machine is transmitted to an electronic subsystem. The electronic subsystem converts the signal to a reference bitmap and transmits the reference bitmap to a raster output scanner in the printing machine. The printing machine reproduces the image on a copy sheet. The image reproduced on the copy sheet is scanned by a raster input scanner and a scanned bitmap generated. A comparison is made between the scanned bitmap and the reference bitmap to determine if the image reproduced on the copy sheet is at an acceptable quality level.

8 Claims, 2 Drawing Sheets

COPY QUALITY MONITORING

This invention relates generally to a an apparatus for monitoring copy quality, and more particularly concerns an electrophotographic printing machine in which a comparison is made between a signal sensing the image reproduced on a copy sheet and an input signal to the printing machine of the desired copy to be reproduced to determine if the image reproduced on the copy sheet is at an acceptable quality level.

Generally, the process of electrophotographic printing includes charging a photoconductive member to a substantially uniform potential so as to sensitize the surface thereof. The charged portion of the photoconductive surface is exposed to a light image corresponding to the copy desired to be reproduced. This records an electrostatic latent image on the photoconductive surface. After the electrostatic latent image is recorded on the photoconductive surface, the latent image is developed by bringing a developer mixture into contact therewith. A common type of developer comprises carrier granules having toner particles adhering triboelectrically thereto. This two-component mixture is brought into contact with the photoconductive surface. The toner particles are attracted from the carrier granules to the latent image. This forms a toner powder image on the photoconductive surface which is subsequently transferred to a copy sheet. The toner powder image is heated to fuse it to the copy sheet.

Remotely controlled printing machines, in particular high volume printing machines, produce large numbers of copies or prints without immediate operator inspection. If there is a defect in the prints, e.g. a deletion, the operator may find the defect only after an entire batch of prints have been printed. This may require that hundreds of pages need to be reprinted. Thus, it is desirable to detect the occurrence of a defect, such as a deletion, and to terminate the printing run. Inasmuch as electrophotographic printing machines are being used as magnetic ink character recognition printers (MICR) for printing checks, it is necessary to determine that extra checks have not been printed. Security can be maintained by providing an automatic reconciliation between the number of checks printed and the number requested to be printed. An audit trail can be provided by determining the total number of checks reproduced and the number of defective checks. Various approaches have been devised to measure copy defects, the following disclosures appear to be relevant:

U.S. Pat. No. 4,674,863, Patentee: Tomosada et al., Issued: June 23, 1987.

U.S. Pat. No. 4,745,434, Patentee: Shimomura et al., Issued: May 17, 1988.

U.S. Pat. No. 4,802,231, Patentee: Davis, Issued: Jan. 31, 1989.

The relevant portions of the foregoing patents may be briefly summarized as follows:

U.S. Pat. No. 4,674,863 discloses a light receiving sensor, which detects the amount of light reflected from an original document being reproduced by the printing machine, and an electrical potential sensor, which detects the state of the photoconductive drum. These signals are used to control the voltage applied to the exposure lamp.

U.S. Pat. No. 4,745,434 describes a photosensor located behind the lens of a copier to detect the density of an original being reproduced. The output from the photosensor is transmitted to a microcomputer which controls developer bias so that the toner image is formed in response to the detected density of the original. Such a control is carried out for each segment of the length of the original.

U.S. Pat. No. 4,802,231 discloses a pattern recognition error reduction system. Errors are reduced by by creating independent error templates which corresponds to patterns which tend to be erroneously matched and linked. These templates are linked to specified reference templates which are stored for comparison.

In accordance with one aspect of the present invention, there is provided an apparatus for monitoring the quality of copies reproduced by a printing machine. The apparatus includes means for transmitting a signal of an image to be reproduced to the printing machine. In response to this signal, the printing machine reproduces the image on a copy sheet. Means are provided for sensing the image reproduced on the copy sheet and generating a signal indicative thereof. Means compare the signal from the sensing means with the signal from the transmitting means to determine if the image reproduced on the copy sheet is at an acceptable quality level.

Pursuant to another aspect of the present invention, there is provided an electrophotographic printing machine of the type in which an image developed on a photoconductive member is transferred to a sheet and fused thereto. The improvement includes means for transmitting a signal of the image to the printing machine. Means are provided for sensing the developed image fused on the copy sheet and generating a signal indicative thereof. Means compare the signal from the sensing means with the signal from the transmitting means to determine if the image reproduced on the copy sheet is at an acceptable quality level.

Figure 2:
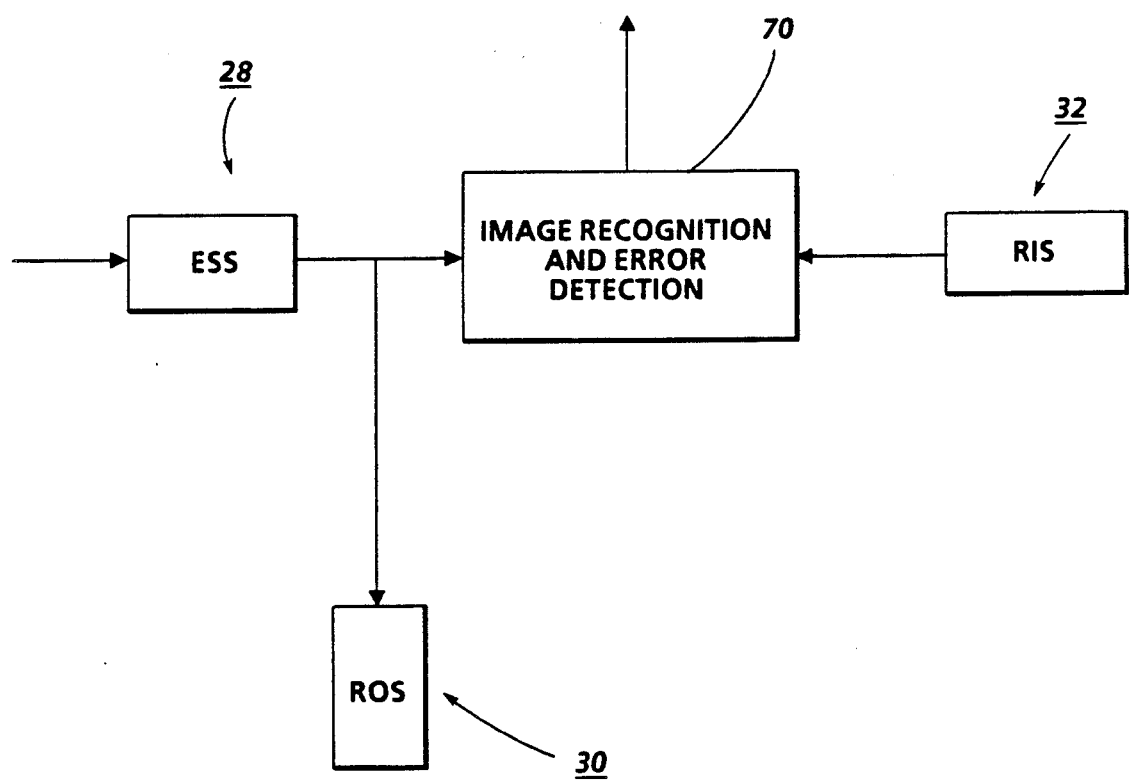

Other features of the present invention will become apparent as the following description proceeds and upon reference to the drawings, in which:

FIG. 1 is a schematic elevational view of an illustrative electrophotographic printing machine incorporating the features of the present invention therein; and FIG. 2 is a block diagram illustrating the quality control system used in the FIG. 1 printing machine.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

Referring now to FIG. 1, the electrophotographic printing machine employs a belt 10 having a photoconductive surface 12 deposited on a conductive substrate 14. Preferably, photoconductive surface 12 is made from a selenium alloy. Conductive substrate 14 is made preferably from an aluminum alloy which is electrically grounded. Belt 10 moves in the direction of arrow 16 to advance successive portions of photoconductive surface 12 sequentially through the various processing stations disposed about the path of movement thereof. Belt 10 is entrained about stripping roller 18, tensioning roller 20 and drive roller 22. Drive roller 22 is mounted rotatably in engagement with belt 10. Motor 24 rotates roller 22 to advance belt 10 in the direction of arrow 16. Roller 22 is coupled to motor 24 by suitable means, such as a drive belt. Belt 10 is maintained in tension by a pair of springs (not shown) resiliently urging tensioning roller 20 against belt 10 with the desired spring force. Stripping roller 18 and tensioning roller 20 are mounted to rotate freely.

Initially, a portion of belt 10 passes through charging station A. At charging station A, a corona generating device, indicated generally by the reference numeral 26 charges photoconductive surface 12 to a relatively high, substantially uniform potential. After photoconductive surface 12 of belt 10 is charged, the charged portion thereof is advanced through exposure station B.

At exposure station B, an electronic subsystem (ESS), indicated generally by the reference numeral 28, receives the image data flow and processes this data to convert it to a bitmap of the image which is transmitted to a raster output scanner (ROS), indicated generally by the reference numeral 30. Preferably, ESS 28 is a self-contained, dedicated minicomputer. The image data flow transmitted to ESS 28 may originate from a computer. This enables the electrophotographic printing machine to serve as a remotely located printer for one or more computers. For example, the printer may be coupled to a plurality of personal computers or workstations, such as the Model No. 6085 manufactured by the Xerox Corporation, on a local area network. Alternatively, the printer may serve as a dedicated printer for a high speed main frame computer. The signal from ESS 28 corresponding to the bitmap of the image desired to be reproduced by the printing machine is transmitted to ROS 30. ROS 30 includes a laser with rotating polygon mirror blocks. Preferably, a nine facet polygon is used. The ROS illuminates the charged portion of photoconductive belt 20 at a rate of about 300 pixels per inch. The ROS will expose the photoconductive belt to record an electrostatic latent image thereon corresponding to the bitmap of the image received from ESS 28. In another embodiment, ESS 28 is connected to a raster input scanner (RIS). The RIS has an original document positioned thereat. The RIS has document illumination lamps, optics, a scanning drive, and photosensing elements, such as a CCD array, i.e. a charge coupled device. The RIS captures the entire image from the original document and converts it to a series of raster scan lines which are transmitted as electrical signals to ESS 28. ESS 28 processes the signals received from the RIS and converts them to a bitmap of the image which is transmitted to ROS 30. ROS 30 exposes the charged portion of the photoconductive belt to record an electrostatic latent image thereon corresponding to the bitmap of the image received from ESS 28.

After the electrostatic latent image has been recorded on photoconductive surface 12, belt 10 advances the latent image to development station C. At development station C, a magnetic brush development system, indicated by the reference numeral 38, advances developer material into contact with the latent image. Preferably, magnetic brush development system 38 includes two magnetic brush developer rollers 40 and 42. Rollers 40 and 42 advance developer material into contact with the latent image. These developer rollers form a brush of carrier granules and toner particles extending outwardly therefrom. The latent image attracts toner particles from the carrier granules forming a toner powder image thereon. As successive electrostatic latent images are developed, toner particles are depleted from the developer material. A toner particle dispenser, indicated generally by the reference numeral 44, dispenses toner particles into developer housing 46 of developer unit 38.

With continued reference to FIG. 1, after the electrostatic latent image is developed, belt 10 advances the toner powder image to transfer station D. A copy sheet 48 is advanced to transfer station D by sheet feeding apparatus 50. Preferably, sheet feeding apparatus 50 includes a feed roll 52 contacting the uppermost sheet of stack 54. Feed roll 52 rotates to advance the uppermost sheet from stack 54 into chute 56. Chute 56 directs the advancing sheet of support material into contact with photoconductive surface 12 of belt 10 in a timed sequence so that the toner powder image formed thereon contacts the advancing sheet at transfer station D. Transfer station D includes a corona generating device 58 which sprays ions onto the back side of sheet 48. This attracts the toner powder image from photoconductive surface 12 to sheet 48. After transfer, sheet 48 continues to move in the direction of arrow 60 onto a conveyor (not shown) which advances sheet 48 to fusing station E.

Fusing station E includes a fuser assembly, indicated generally by the reference numeral 62, which permanently affixes the transferred powder image to sheet 48. Fuser assembly 60 includes a heated fuser roller 64 and a back-up roller 66. Sheet 48 passes between fuser roller 64 and back-up roller 66 with the toner powder image contacting fuser roller 64. In this manner, the toner powder image is permanently affixed to sheet 48.

After fusing, sheet 48 advances through chute 68. A RIS, indicated generally by the reference numeral 32, senses the image fused to the copy sheet and transmits a signal corresponding to the fused Image. RIS 32 has document illumination lamps, optics, and photosensing elements, such as a CCD array, i.e. a charge coupled device. The RIS has a resolution of about 47 pixels per inch. The raster scan line signal from RIS 32 is converted to a bitmap of the image fused to the copy sheet. The bitmap of the image fused to the copy sheet is compared to the bitmap of the image transmitted to ESS 30 to determine if the image fused to the copy sheet is of acceptable quality. In the event the image fused to the copy sheet is beneath the acceptable quality level, a fault is indicated and displayed to the operator at the workstation of the computer coupled to the ESS and/or on the printing machine console. With continued reference to FIG. 1, chute 68 advances sheet 48 to catch tray 72 for subsequent removal from the printing machine by the operator.

After the copy sheet is separated from photoconductive surface 12 of belt 10, the residual toner particles adhering to photoconductive surface 12 are removed therefrom at cleaning station F. Cleaning station F includes a rotatably mounted fibrous brush 74 in contact with photoconductive surface 12. The particles are cleaned from photoconductive surface 12 by the rotation of brush 74 in contact therewith. Subsequent to cleaning, a discharge lamp (not shown) floods photoconductive surface 12 with light to dissipate any residual electrostatic charge remaining thereon prior to the charging thereof for the next successive imaging cycle.

It is believed that the foregoing description is sufficient for purposes of the present application to illustrate the general operation of an electrophotographic printing machine incorporating the features of the present invention therein.

Referring now to FIG. 2, there is shown a block diagram of the quality control system used in the FIG.

1 printing machine. As depicted thereat, ESS 28 converts the incoming signal into a bitmap of the image desired to be reproduced by the printing machine. The image bitmap is transmitted from ESS 28 to ROS 30. In addition, the bitmap of the desired image its also transmitted to an image recognition and error detection minicomputer, indicated generally by the reference numeral 70. RIS 32 transmits raster scan lines of the image fused to the copy sheet to image recognition and error detection minicomputer 70. Minicomputer 70 compares the bitmap of the desired image (reference bitmap) to the bitmap of the fused image (scanned bitmap) and determines if the quality level of the fused image is acceptable. Minicomputer 70 identifies all the solid and background areas which are larger than a preset threshold. For example, if the threshold is 5 millimeters, there areas would be background areas around the text and spaces between the paragraphs. Regular text areas and halftones or thin lines are excluded. High solid area density portions are identified similarly. If there are no solid areas present, the text areas which appear statistically uniform may also be identified for approximate evaluation of maximum density. Average area coverage and the anticipated average ratio of light reflected by the text area to the light reflected by the background is used for this calculation. As soon as the fused image is scanned by RIS 32, the pattern recognition algorithms register the scanned bitmap against the reference bitmap. The procedure is an error minimization iteration. An error is recorded whenever the scanned bitmap differs from the reference bitmap. In checking solid area and line developability, it is assumed that the scanned bitmap has only text and background. The difference between the reference bitmap and the scanned bitmap may be large resulting in a defect being recorded, or the difference may be small resulting in no defect. Alternatively, the difference may be in the intermediate range which requires that the measurements be repeated or that a test pattern having known solid area and line developability be used to verify the results. If the error appears inside a uniform area rather than at the border, the coordinates are recorded with a higher weight. If the number of spots in this group is large, the registration iterations are repeated with such spots excluded. Improved match confirms the registration validity and reduces the number of of required confirmations. Errors appearing in the boundary region between the solid and background areas may be a misregistration of the borderline rather than a defect indication. If the error is not a deletion along the line between the solid area and background, it is recorded as a lower weight error. If the error spots are almost continuous along the border line between the solid areas and background areas, and the error line is substantially perpendicular to the process direction on the lead or trail edge, it is recorded as a higher weight defect. Shape test are applied when the error areas are large. At this point minicomputer 70 may have stored a record of several types of defects with coordinates and weighting levels computed according to algorithms accounting for the number of spots or pixels, defect type and passage of subsequent verification tests. The defect record may also be compared against shapes, repetition intervals and other characteristics of known defects. A resident artificial intelligence self diagnostic unit may be used to further process the defect record. These levels are compared against preset thresholds. The thresholds may be adaptive and depend upon the type of print, paper, number of remaining prints in the run, relative humidity, etc.. In the event that minicomputer 70 determines that the quality of the scan bitmap is not acceptable, a fault condition exits. Under these circumstances, minicomputer 70 transmits a fault signal to the computer or workstation coupled to the ESS and/or to the console of the printing machine. This results in a display on the computer and/or the printing machine console indicating that the copy is beneath the acceptable quality level. Minicomputer 70 counts the total number of copy sheets and the number of copy sheets having defective images. All of these counts are displayed. This provides an audit trail enabling tracking of defective and acceptable copies.

In recapitulation, it is evident that the apparatus of the present invention compares a bitmap of the desired image with a bitmap of the fused image to determine if the fused image is at an acceptable quality level. A RIS scans the fused image and transmits raster scan lines to a minicomputer which converts the raster scan lines to a scanned bitmap of the fused image. The ESS transmits a reference bitmap of the desired image to the minicomputer. The minicomputer compares the scanned bit map with the reference bitmap to determine defects in the fused image. In the event the quality of the fused image is beneath an acceptance threshold, a fault signal is transmitted from the minicomputer to the computer or workstation and/or printer console for display to the operator. In addition, the minicomputer tracks the total number of copy sheets printed by the printing machine, and the number of defective copy sheets. This information may also be displayed.

It is, therefore, apparent that there has been provided in accordance with the present invention, an apparatus for monitoring copy quality in an electrophotographic printing machine that fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

I claim:

1. An apparatus for monitoring the quality of copies reproduced by a printing machine, including:

means for transmitting a signal of an image to be reproduced to the printing machine, and, in response thereto, the printing machine reproduces the image on a copy sheet;

means for sensing the image reproduced on the copy sheet and generating a signal indicative thereof; and means for comparing the signal from said sensing means with the signal from said transmitting means to determine if the image reproduced on the copy sheet is at an acceptable quality level, said comparing means providing a count of the number of copy sheets having images reproduced thereon by the printing machine and a count of the number of copy sheets having images reproduced thereon which are beneath the acceptable quality level wherein said comparing means counts a plurality of copy sheets having images reproduced thereon by the printing machine and a plurality of copy sheets having images reproduced thereon which are beneath the acceptable quality level.

2. An apparatus according to claim 1, wherein the printing machine includes:
   means, responsive to the signal from said transmitting means, for generating an image; and
   means, operatively associated with said generating means, for reproducing the image on a copy sheet.

3. An apparatus according to claim 2, wherein the signal from said transmitting means is a bitmap of the image.

4. An apparatus according to claim 2, wherein said sensing means includes a raster input scanner.

5. An electrophotographic printing machine of the type in which an image developed on a photoconductive member is transferred to a sheet and fused thereto, wherein the improvement includes:
   means for transmitting a signal of the image to the printing machine;
   means for sensing the developed image fused on the copy sheet and generating a signal indicative thereof; and
   means for comparing the signal from said sensing means with the signal from said transmitting to determine if the image reproduced on the copy sheet is at an acceptable quality level, said comparing means provides a count of the number of copy sheets having images reproduced thereon and a count of the number of copy sheets having images reproduced thereon which are beneath the acceptable quality level wherein said comparing means counts a plurality of copy sheets having images reproduced thereon by the printing machine and a plurality of copy sheets having images reproduced thereon which are beneath the acceptable quality level.

6. A printing machine according to claim 5, wherein further including:
   means, responsive to the signal from said transmitting means, for generating an image; and
   means, operatively associated with said generating means, for reproducing the image on a copy sheet.

7. A printing machine according to claim 6, wherein the signal from said transmitting means is a bitmap of the image.

8. A printing machine according to claim 7, wherein said sensing means includes a raster input scanner.

* * * * *